United States Patent [19]

Bodenbenner et al.

[11] 3,992,247

[45] Nov. 16, 1976

[54] PROCESS FOR THE CONCENTRATION OF DILUTED SALT-CONTAINING SULPHURIC ACID

[75] Inventors: Kurt Bodenbenner, Wiesbaden; Gerhard Müller, Kelkheim, Taunus; Heinrich Müller, Neu-Isenburg, all of Germany

[73] Assignee: Hoechst Aktiengesellschaft, Frankfurt am Main, Germany

[22] Filed: Oct. 17, 1974

[21] Appl. No.: 515,660

[30] Foreign Application Priority Data

Oct. 20, 1973 Germany............................ 2352701

[52] U.S. Cl............................ 159/47 R; 423/531; 159/DIG. 19
[51] Int. Cl.$^2$.................. H01B 13/00; C01B 17/84; C01B 17/90
[58] Field of Search........... 159/165, DIG. 19, 47 R; 23/306; 202/233; 423/528, 531, 551

[56] References Cited
UNITED STATES PATENTS 1,934,234   11/1933   Phillips............................... 423/528

FOREIGN PATENTS OR APPLICATIONS 390,634   4/1933   United Kingdom................... 23/306
547,600   9/1942   United Kingdom................... 423/528

OTHER PUBLICATIONS

Manufacture of Sulfuric Acid, 1959, pp. 328, 333, Mantius–Concentrating Sulfuric Acid, Reinhold, N.Y.

*Primary Examiner*—Miram H. Bernstein
*Attorney, Agent, or Firm*—Curtis, Morris & Safford

[57] ABSTRACT

A two step process for concentrating and desalting dilute sulfuric acid including, first indirectly countercurrently contacting and heating the dilute acid with steam from a second step, removing overhead water vapor and withdrawing concentrated acid, and second further concentrating the acid by directly countercurrently contacting and heating the acid with superheated steam, removing overhead steam and additional water vapor, which is used in the first heating step. Acid of a higher concentration is withdrawn and cooled to crystallize and remove salts and the more highly concentrated sulphuric acid recovered.

5 Claims, 1 Drawing Figure

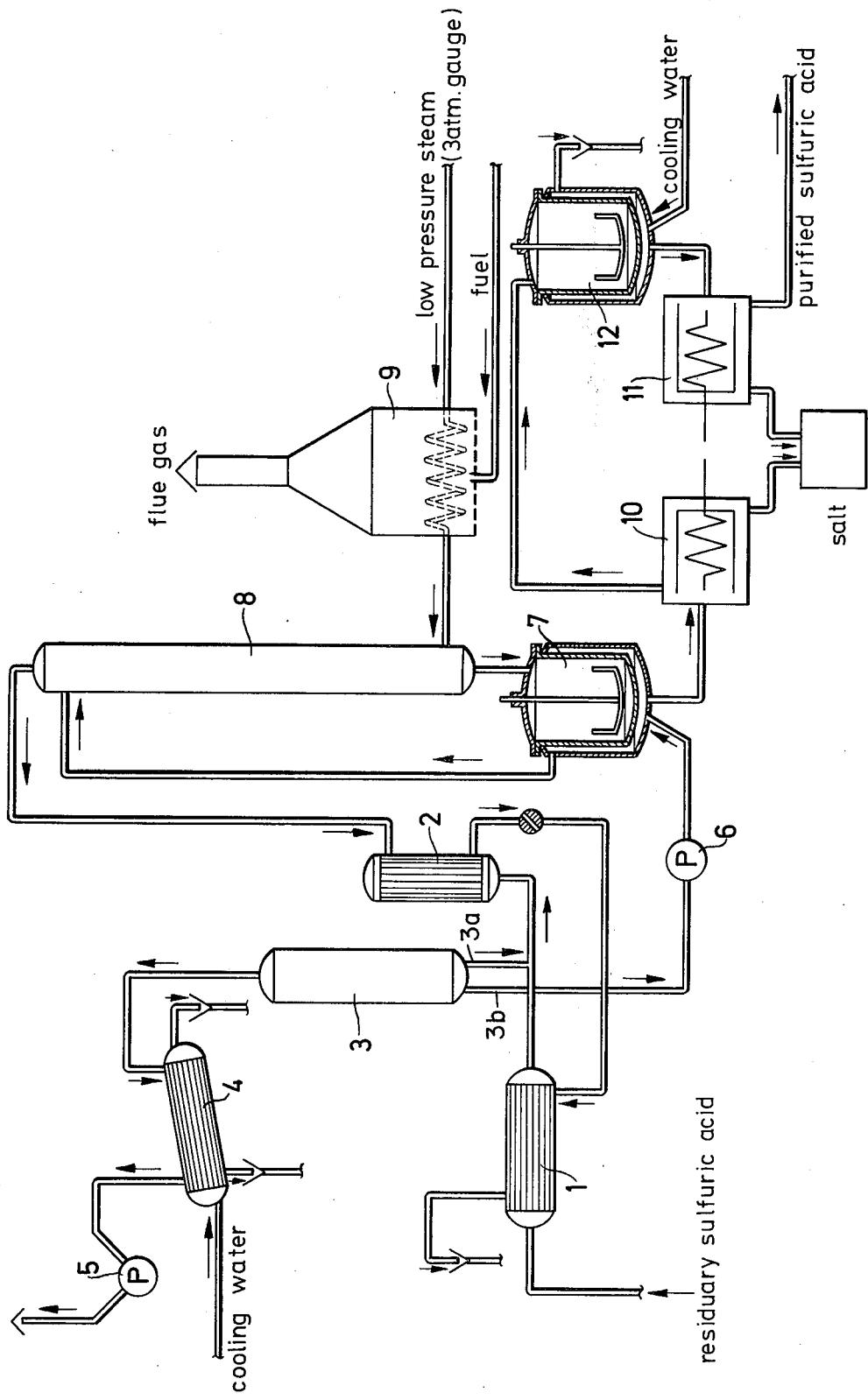

PROCESS FOR THE CONCENTRATION OF DILUTED SALT-CONTAINING SULPHURIC ACID

Subject of the present invention is a process for concentrating diluted salt containing sulphuric acid.

A series of chemical reactions yield as by-products diluted salt containing sulphuric acids, which cannot be recycled as such into the process and have to be eliminated. These acids could be regenerated to a useable form by means of concentration. The mere concentration of pure diluted sulphuric acid is already a difficult technological problem, since the metals being usually applied for the processing corrode in short time. The corrosion problem is the more enhanced in those cases when the diluted sulphuric acid ' under concentration conditions — contains corrosive salts, for example sodium chloride, iron sulfate, sodium bromide etc. In the so-called immersion heater process, for example, sulphuric acid is concentrated from a rate of about 20 % to approximately 70 % by means of an immersion heater, thus permitting operating times of approximately 2000 hours for the heater tubes made of cast iron. By that time, the tubes are corroded thoroughly at the lower end as far as they are immersed into the acid. On the other hand, if chloride containing acids are used, the heater tubes may be destroyed already after approximately 200 operating hours.

The use of glass instead of a metal as technological material eliminates corrosion problems — as long as fluoride-containing acids are avoided —, but puts also limits on the constructional possibilities for the operating equipment. It is relatively easy to destroy glass parts either mechanically or by temperature shock, a factor deserving special attention in case of apparatus for concentrating sulphuric acid because of the special risks involved. Therefore, for technological purpose the container should be either filled with relatively diluted acid or, at higher concentration rates, the operations should be carried out with practically empty apparatus. For example, use is made of circulation evaporators consisting of a still and an evaporator made of glass for concentrating diluted sulphuric acid to approximately 80 %. In this case, special safety measures are required for the range above approximately 50 % for a possible fracture of the apparatus. Salt containing acid present the further inconvenience that the salt concentration in the circulating concentrated acid increases to such an extent that at the cooler zones, especially at the connection between the still the evaporator, salt crystals are precipitating, then stick onto the wall and thus affect detrimentally the functioning of the apparatus. Another inconvenience of the circulation evaporator at concentration rates above 50 % is the heat transfer. Since evaporators made of glass should not be oparated with overpressure vapor for safety reasons and the thermal conductivity of glass is relatively unfavorable, the evaporator tubes are usually made of tantalum which can be operated with overpressure vapor, but which start corroding at temperatures above 165° C so that their use is restricted.

For avoiding the aforesaid inconveniences a process has now been found for concentrating diluted salt containing sulphuric acid which comprises treating the said diluted acid in two steps in the first step by indirect heat exchange with the vapor of the second step, and in the second step by direct heat exchange with superheated steam.

More particularly, salt containing sulphuric acid is concentrated in two steps, in the first step the said acid is heated and concentrated by indirect heat exchange with the vapor emerging from the second step, the acid emerging from the first step is fed to the second step where it is concentrated by direct heat exchange with superheated steam, and the inorganic salts contained in the sulphuric acid are separated by crystallization by cooling the concentrated sulphuric acid emerging from the second step.

The process is conveniently carried out in apparatus made of glass. During the evaporation in the second step the sulphuric acid is contacted with the superheated steam exclusively. Heat exchange areas resistant to high technological and chemical stress can therefore be dispensed with. Due to the high coefficients for heat and mass transfer on one drop and due to the possibility of increasing randomly the area of water and substance interchange by spraying the acid, the space required for evaporation is relatively small.

Practical experience proved the following operation to be advantageous: the diluted acid is concentrated in the first step at a pressure of from 50 to 150 mm Hg to about 50 %, and in a second step this 50 % acid is contacted with superheated steam in counter-current flow in a column provided with filling bodies or plates. When using a column made of glass vapor of from 350°–450° C can be processed without adversely affecting the apparatus. Higher temperatures of the vapor are also tolerable, if the column is protected accordingly or the speed of the heat interchange is adapted conveniently. By adjusting the proportion of acid to steam, vapor leaves the column at a temperature of from 100 to 150° C. This vapor is used for heating the circulation evaporator and, optionally, for further heating a heat exchange device preceding the circulation evaporator. The residual gases still present in the vapor can be separated after condensation of the steam. Salts forming upon cooling of the concentrated acid are also separated.

The second step is usually carried out at normal pressure, but it is also possible to evaporate in vacuo.

The concentrations of 20 or 50 % for the initial acid concentrated in the first step are not critical. It is as well possible to use diluted acid of other concentration rates, for example 10 % or 30 %, or 10 to 30 %. A further possibility is to vary the concentration of the acid from the first step, depending on the initial concentration of the acid and, moreover, on the quantity and the temperature of the superheated steam for the second step. Furthermore, the conditions should be chosen in such a way that the condensation heat of the vapor emanating from the second step be put to use completely in the first step. For example, the vapor forming in the second step upon concentration with superheated stem of 450° C of 36.4 kg of 55 % sulphuric acid to yield 25 kg of 80 % sulphuric acid suffices to transform in the first step 100 kg of 20 % sulphuric acid to 36.4 kg of 44 % sulphuric acid.

In course of the evaporation process not only water is driven out, but also volatile acids, for example a NaCl-containing sulphuric acid does not contain any chloride after concentration. Upon cooling, sodium hydrogen sulfate is crystallizing out of the 80 % sulphuric acid.

The process of the invention offers the special advantage that degradation products forming upon concentration, for example $SO_2$, nitrose etc. are not diluted by inert gases, as it is unavoidable e.g. in the immersion heater process; particularly since said degradation products are difficult to eliminate from these gases.

The process is illustrated by way of example by the accompanying drawing representing a flow chart.

20 % sulphuric acid contaminated by salts and having a temperature of 20° C is pre-heated in the heat exchange device 1 by means of the condensate of circulation evaporator 2 and fed into this latter. The vapor emanating from still 3 is condensed in the condenser 4, while the inert gases are evacuated by the vacuum pump 5 which reduces the pressure upon evaporation. A portion of the concentrated acid is recirculated via line 3a to circulator evaporator 2 for additional heating and the remainder via 3b is transmitted into the column 8 by means of pump 6 via the heat exchange device with agitator 7. In column 8 the concentrated acid is met by a counter-current of superheated low-pressure steam heated in heater 9.

The vapor emerging from the top of the column is used as heating means in the circulation evaporator 2.

The column sump transmits a large part of its heat in the heat exchange with agitator device 7. While cooling, part of the salt is formed and then separated in the centrifuge 10. Further cooling takes place in the heat exchange device with agitator 12, and the salts still formed are separated in the centrifuge 11. The concentrated and partially desalted acid can then be concentrated further according to current processes, for example according to the Pauling-process, to yield a 96 % sulphuric acid. It is as well possible to use it to produce $SO_2$.

The following Examples illustrate the invention.

EXAMPLE 1

101.5 kg/h of 20 % sulphuric acid containing 1.5 kg of NaCl/100 kg of diluted acid are fed at 20° C into an apparatus as per the given description. In the circulation evaporator operated at 50 mm Hg 63.6 kg/h of water are eliminated by distillation. The sump of the circulation evaporator having a temperature of 60° C is heated to 100° C by heat exchange with the hot 80 % sulphuric acid and subsequently concentrated further in the column in counter-current flow by means of 54 kg/h of overheated steam of 450° C. The temperature in the sump of the column amounts to 190° C, whilst the temperature at the top of the column indicates 128° C. For superheated the steam 1.2 kg/h of fuel oil is required. The 80 % sulphuric acid, while being hot, contains sodium hydrogen sulfate, part of which is crystallizing out upon cooling. The residue is an acid free of chloride, containing approximately 1 % of $Na_2SO_4$.

EXAMPLE 2

The diluted acid used is composed of 19 % of $H_2SO_4$, 76 % of $H_2O$ and 5 % of $Na_2SO_4$. After having concentrated according to Example 1, a hot acid is formed which contains 65.5 % of $H_2SO_4$, 16.5 % of $H_2O$ and 18 % of $Na_2SO_4$. After cooling and separating the precipitated sodium hydrogen sulfate an acid is obtained which is still contaminated by approximately 1 % of $Na_2SO_4$.

What is claimed is:

1. A process for concentrating and desalting dilute sulphuric acid including two heating steps, which process comprises first heating and concentrating a 10 to 30 % dilute sulfuric acid at a pressure of 50 to 150 mm Hg by indirectly countercurrently contacting said acid with steam at a temperature of 100° to 150° C from a second step, removing water vapor from the heated acid and withdrawing up to about 50% concentrated sulfuric acid, further concentrating the acid in a second heating step by directly countercurrently contacting and heating the concentrated acid with a superheated steam at a temperature of 350° to 450° C, separating steam and additional water vapor from the heated acid, said steam being used in the first heating step, withdrawing acid of a higher and up to about 80% concentration, cooling said acid to crystallize salts therefrom, separating the salts and recovering the more highly concentrated sulfuric acid.

2. A process for concentrating and desalting dilute sulphuric acid including two heating steps, which comprises first heating and concentrating a dilute sulphuric acid containing less than 50% sulphuric acid at a pressure of about 50 150 mm Hg by indirectly countercurrently contacting said acid with steam at a temperature of about 100° to 150° C from a second step, removing water vapor from the heated acid and withdrawing an up to about 50% concentrated sulphuric acid, further concentrating the acid in a second heating step by directly countercurrently contacting and heating the concentrated acid with a superheatd steam at a temperature of about 350° to 450° C, separating steam and additional water vapor from the heated acid, said steam being used in the first heating step, withdrawing acid of a higher and up to about 80% concentration, cooling said acid to crystallize salts therefrom, separating the salts and recovering the more highly concentrated sulphuric acid.

3. The process of claim 2 wherein the concentration of a dilute acid is about 20% up to but less than 50% sulphuric acid.

4. The process of claim 2 wherein the dilute acid comprises a salt which is a member selected from the group consisting of sodium chloride, iron sulphate and sodium bromide.

5. The process of claim 2 wherein crystallized sodium hydrogen sulphate is separated from the concentrated sulphuric acid withdrawn from the second heating step.

* * * * *